United States Patent
Drake (10) Patent No.: US 10,791,080 B2
(45) Date of Patent: Sep. 29, 2020

(54) SYSTEMS AND METHODS FOR CONDITIONALLY DISPLAYING NOTIFICATION MESSAGES

(71) Applicant: Haier US Appliance Solutions, Inc., Wilmington, DE (US)

(72) Inventor: Jeff Donald Drake, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 108 days.

(21) Appl. No.: 16/135,589

(22) Filed: Sep. 19, 2018

(65) Prior Publication Data
US 2020/0092241 A1    Mar. 19, 2020

(51) Int. Cl.
| | | |
|---|---|---|
| G06F 15/16 | (2006.01) | |
| H04L 12/58 | (2006.01) | |
| G06F 1/16 | (2006.01) | |
| G06F 21/44 | (2013.01) | |
| G06K 9/00 | (2006.01) | |

(52) U.S. Cl.
CPC ............ *H04L 51/14* (2013.01); *G06F 1/1601* (2013.01); *G06F 21/445* (2013.01); *G06K 9/00369* (2013.01)

(58) Field of Classification Search
CPC ....... H04L 51/14; G06F 1/1601; G06F 21/445
USPC ................. 709/202–203, 204–205, 206–207
See application file for complete search history.

(56) References Cited

U.S. PATENT DOCUMENTS

| | | | |
|---|---|---|---|
| 7,209,955 B1 | 4/2007 | Major et al. | |
| 8,819,149 B2 * | 8/2014 | Amidon | H04L 67/24 709/206 |
| 8,996,631 B1 * | 3/2015 | Staddon | H04L 9/3271 709/206 |
| 9,608,952 B2 * | 3/2017 | Wan | H04L 51/14 |
| 10,504,384 B1 * | 12/2019 | Drake | G09B 19/003 |
| 2015/0123899 A1 * | 5/2015 | Taylor | G06F 3/0425 345/157 |

FOREIGN PATENT DOCUMENTS

WO    WO2018055716 A1    3/2018

* cited by examiner

*Primary Examiner* — Bharat Barot
(74) *Attorney, Agent, or Firm* — Dority & Manning, P.A.

(57) ABSTRACT

A user engagement system and methods for operating the same to display notification messages are provided herein. The user engagement system may include a camera assembly, an image monitor, and a controller configured to initiate a message-display operation based on a signal received from a user device. The camera assembly may be mounted in a fixed position and directed away from a cabinet of a cooking appliance. The image monitor may be directed away from the cabinet.

20 Claims, 6 Drawing Sheets

FIG. 6

SYSTEMS AND METHODS FOR CONDITIONALLY DISPLAYING NOTIFICATION MESSAGES

FIELD OF THE INVENTION

The present subject matter relates generally to systems and methods for presenting notifications during cooking operations or near a cooking appliance.

BACKGROUND OF THE INVENTION

Cooking appliances, such as cooktops, ovens, or range appliances, generally include heating elements for heating cooking utensils, such as pots, pans and griddles. A variety of configurations can be used for the heating elements located on or within the cooking appliance. Although these heating elements can vary in size, location, and capability across the appliance, they generally require a user to be in close proximity to the cooking appliance during use.

In some cases, it may be useful for a user to interact with other devices, individuals, or both while using a cooking appliance. For instance, users often want to receive notifications or messages, such as from a cell phone, while using a cooking appliance. However, it is often not convenient or even possible for a user to see or reach a cell phone while using a cooking appliance. The environment near the cooking appliance may be unsuitable for a cell phone, or user's hands may simply be otherwise occupied. Moreover, looking or moving away from cooking appliance while it is in use may be dangerous. Simply mirroring messages (e.g., from a cell phone) to a separate screen may create additional issues. For instance, privacy concerns may arise if a user's messages are presented at a separate screen even when the user is away from that screen or another individual is able to view the screen while messages are being mirrored. Common methods for identifying a specific user, such as a facial recognition algorithm, are often resource intensive and can be difficult to implement.

As a result, improved systems are needed for facilitating user engagement and interaction during use of a cooking appliance. In particular, it may be advantageous to provide a user engagement system that can efficiently and effectively permit notifications or messages from another device to be displayed at the user engagement system.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a method of operating a user engagement system is provided. The method may include receiving a wireless connection signal from a user device at a stationary interactive assembly, and determining prior registration of the user device at the stationary interactive assembly subsequent to receiving the wireless connection signal. The method may also include receiving an image signal from a camera assembly mounted to the stationary interactive assembly subsequent to determining prior registration, and determining a user presence based on the received image signal. The method may further include displaying a forwarded notification message from the user device at an image monitor mounted to the stationary interactive assembly subsequent to determining the user presence.

In another exemplary aspect of the present disclosure, a user engagement system is provided. The user engagement system may include a camera assembly, an image monitor, and a controller configured to initiate a message-display operation. The camera assembly may be mounted in a fixed position and directed away from a cabinet of a cooking appliance. The image monitor may be directed away from the cabinet. The message-display operation may include receiving a wireless connection signal from the user device, determining prior registration of the user device subsequent to receiving the wireless connection signal, receiving an image signal from the camera assembly subsequent to determining prior registration, determining a user presence based on the received image signal, and displaying a forwarded notification message from the user device at the image monitor subsequent to determining the user presence.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the term "or" is generally intended to be inclusive (i.e., "A or B" is intended to mean "A or B or both"). The terms "first," "second," and "third" may be used interchangeably to distinguish one component from another and are not intended to signify location or importance of the individual components.

Generally, the present disclosure provides methods and systems for privately displaying notifications or messages from a user device on a stationary interactive assembly adjacent to a cooking appliance.

Figure 1:
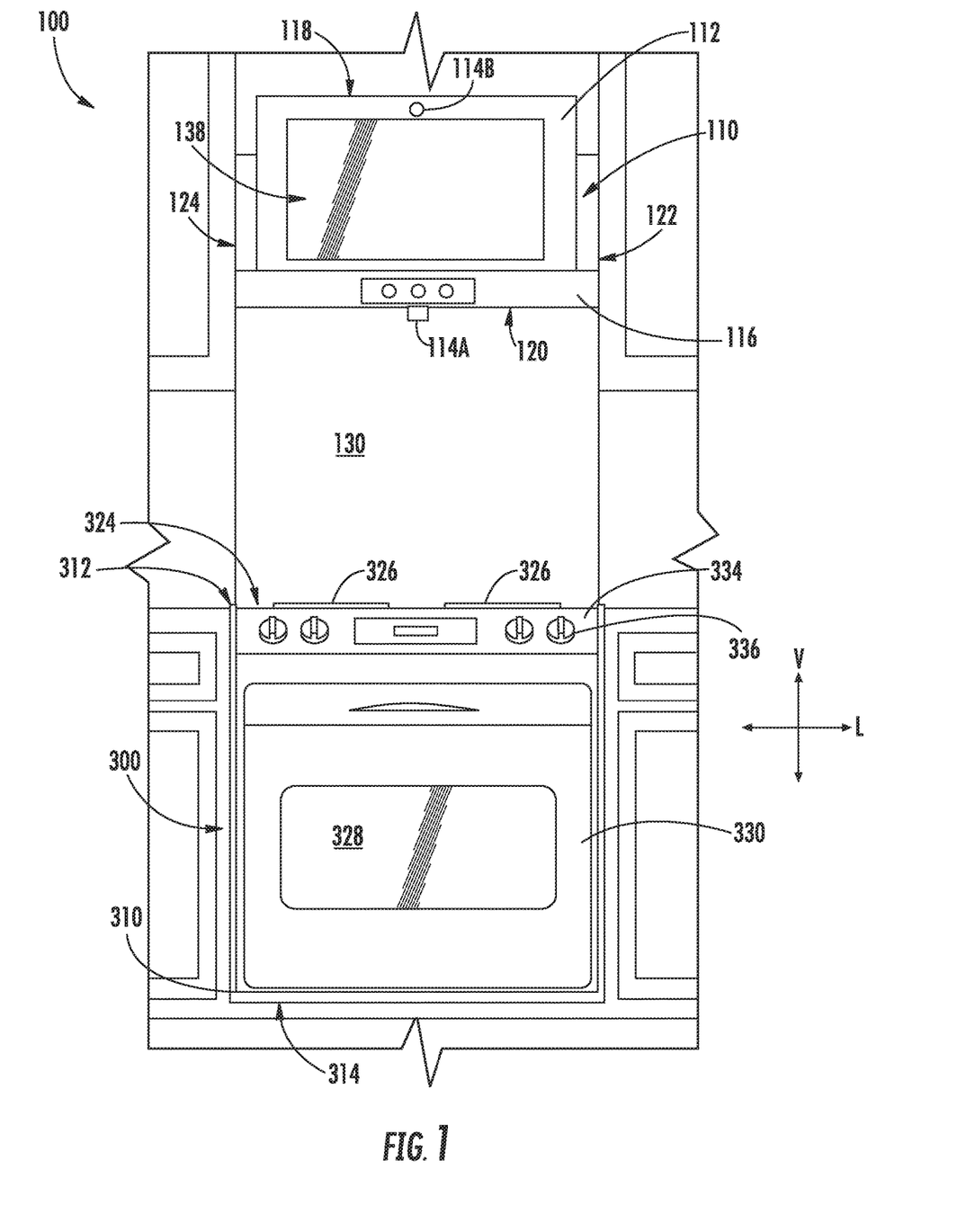
FIG. 1 provides a front perspective view of a system according to exemplary embodiments of the present disclosure.
Figure 2:
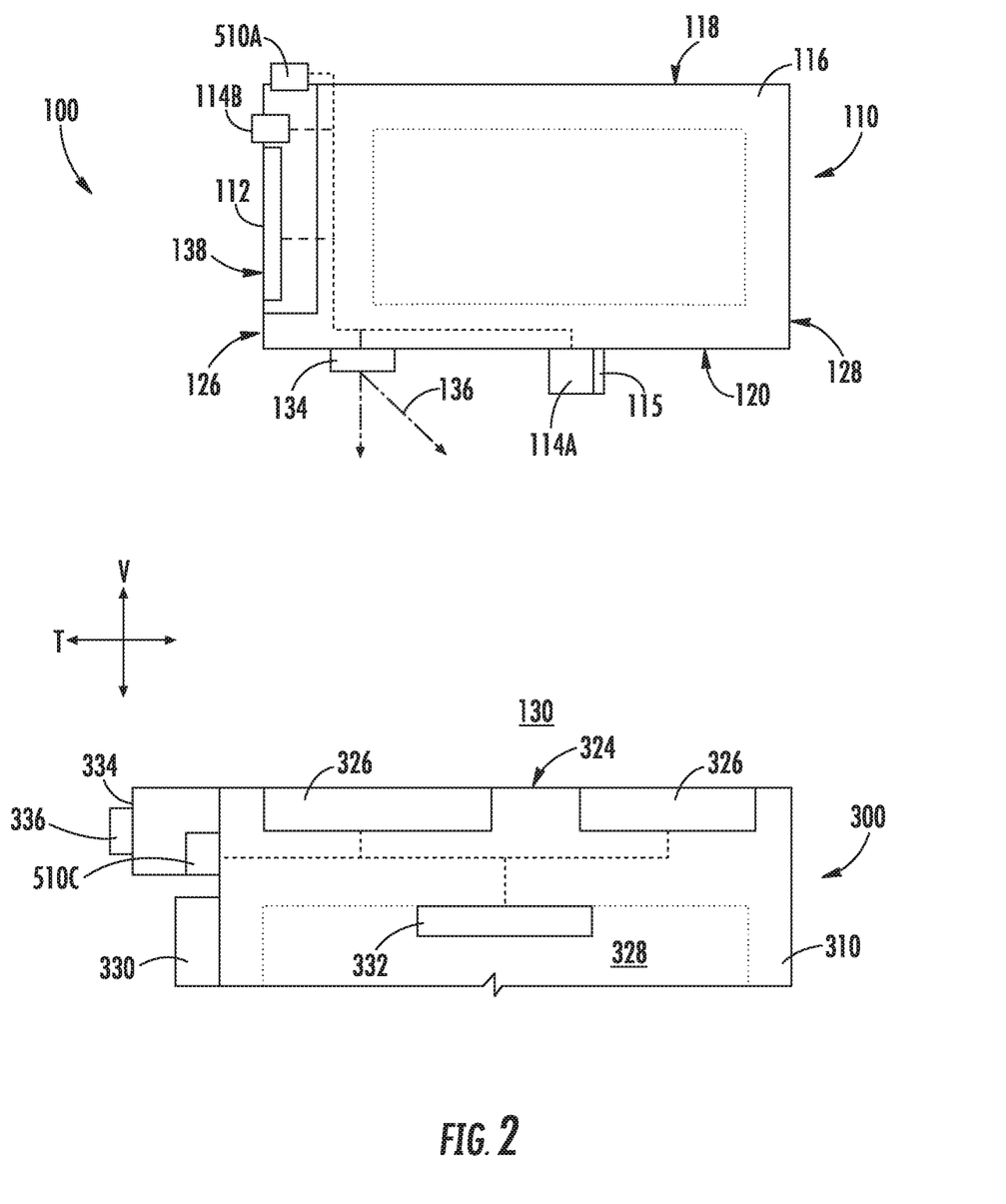
FIG. 2 provides a side schematic view of the exemplary system of FIG. 1.

As shown cooking appliance 300 defines a vertical direction V, a lateral direction L, and a transverse direction T, for example, at a cabinet 310. The vertical, lateral, and transverse directions are mutually perpendicular and form an orthogonal direction system. As shown, cooking appliance 300 extends along the vertical direction V between a top portion 312 and a bottom portion 314; along the lateral direction L between a left side portion and a right side portion; and along the traverse direction T between a front portion and a rear portion.

Figure 3:
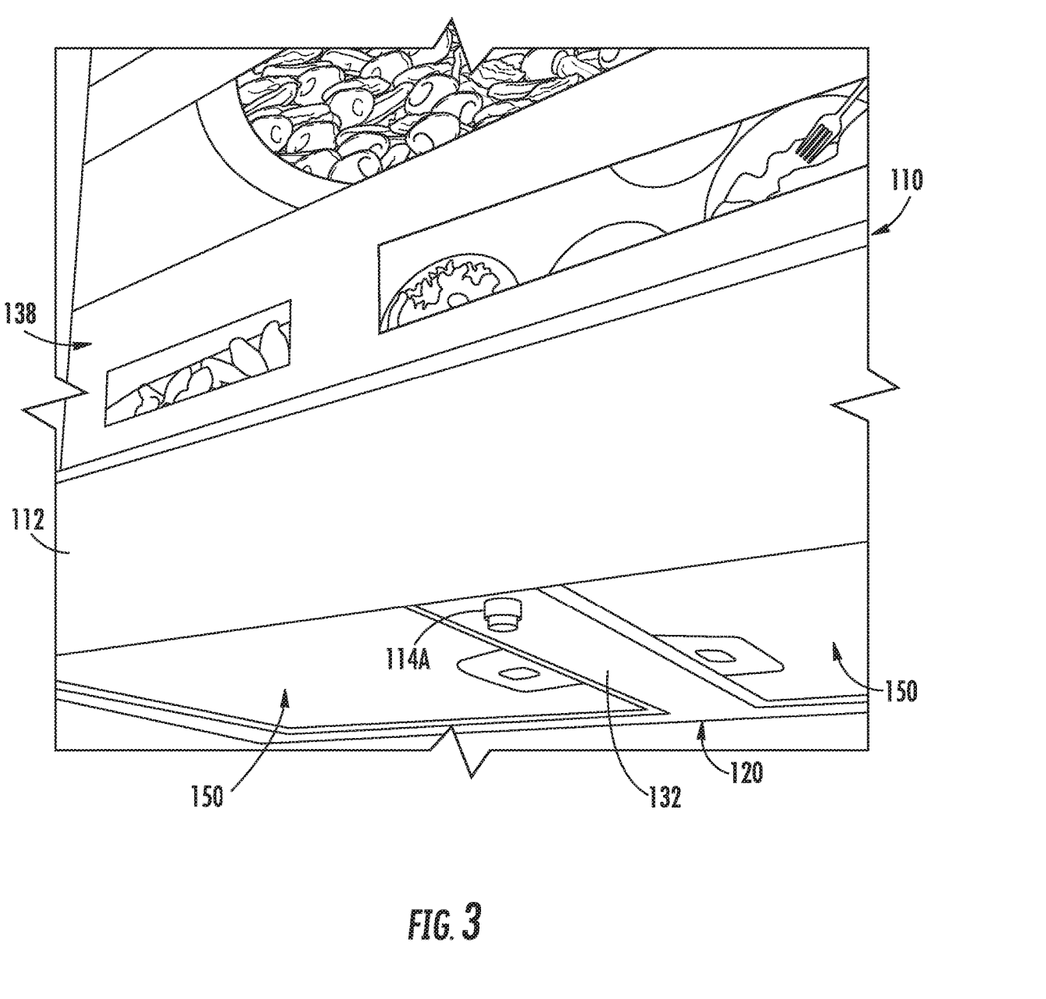
FIG. 3 provides a bottom perspective view of a portion of the exemplary system of FIG. 1.

Turning to the figures, FIGS. 1 through 3 provide various views of a system 100 according to exemplary embodiments of the present disclosure. System 100 generally includes a stationary interactive assembly 110 with which a user may interact or engage. Interactive assembly 110 may have a controller 510A in operable communication with an image monitor 112 and one or more camera assemblies (e.g., camera assembly 114A and camera assembly 114B) that are generally positioned above a cooking appliance 300.

Cooking appliance 300 can include a chassis or cabinet 310 and a cooktop surface 324 having one or more heating elements 326 for use in, for example, heating or cooking operations. In exemplary embodiments, cooktop surface 324 is constructed with ceramic glass. In other embodiments, however, cooktop surface 324 may include of another suitable material, such as a metallic material (e.g., steel) or another suitable non-metallic material. Heating elements 326 may be various sizes and may employ any suitable method for heating or cooking an object, such as a cooking utensil (not shown), and its contents. In one embodiment, for example, heating element 326 uses a heat transfer method, such as electric coils or gas burners, to heat the cooking utensil. In another embodiment, however, heating element 326 uses an induction heating method to heat the cooking utensil directly. In turn, heating element 326 may include a gas burner element, resistive heat element, radiant heat element, induction element, or another suitable heating element.

In some embodiments, cooking appliance 300 includes an insulated cabinet 310 that defines a cooking chamber 328 selectively covered by a door 330. One or more heating elements 332 (e.g., top broiling elements or bottom baking elements) may be enclosed within cabinet 310 to heat cooking chamber 328. Heating elements 332 within cooking chamber 328 may be provided as any suitable element for cooking the contents of cooking chamber 328, such as an electric resistive heating element, a gas burner, microwave element, halogen element, etc. Thus, cooking appliance 300 may be referred to as an oven range appliance. As will be understood by those skilled in the art, cooking appliance 300 is provided by way of example only, and the present subject matter may be used in any suitable cooking appliance, such as a double oven range appliance, stand-alone oven, wall-mounted oven, or a standalone cooktop (e.g., fitted integrally with a surface of a kitchen counter). Thus, the example embodiments illustrated in figures are not intended to limit the present subject matter to any particular cooking chamber or heating element configuration, except as otherwise indicated.

As illustrated, a user interface or user interface panel 334 may be provided on cooking appliance 300. Although shown at the front portion of cooking appliance 300, another suitable location or structure (e.g., a backsplash) for supporting user interface panel 334 may be provided in alternative embodiments. In some embodiments, user interface panel 334 includes input components or controls 336, such as one or more of a variety of electrical, mechanical, or electro-mechanical input devices. Controls 336 may include, for example, rotary dials, knobs, push buttons, and touch pads. A controller 510C is in communication with user interface panel 334 and controls 336 through which a user may select various operational features and modes and monitor progress of cooking appliance 300. In additional or alternative embodiments, user interface panel 334 includes a display component, such as a digital or analog display in communication with a controller 510C and configured to provide operational feedback to a user. In certain embodiments, user interface panel 334 represents a general purpose I/O ("GPIO") device or functional block.

As shown, controller 510C is communicatively coupled (i.e., in operative communication) with user interface panel 334 and its controls 336. Controller 510C may also be communicatively coupled with various operational components of cooking appliance 300 as well, such as heating elements (e.g., 326, 332), sensors, etc. Input/output ("I/O") signals may be routed between controller 510C and the various operational components of cooking appliance 300. Thus, controller 510C can selectively activate and operate these various components. Various components of cooking appliance 300 are communicatively coupled with controller 510C via one or more communication lines such as, for example, conductive signal lines, shared communication busses, or wireless communications bands.

Figure 4:
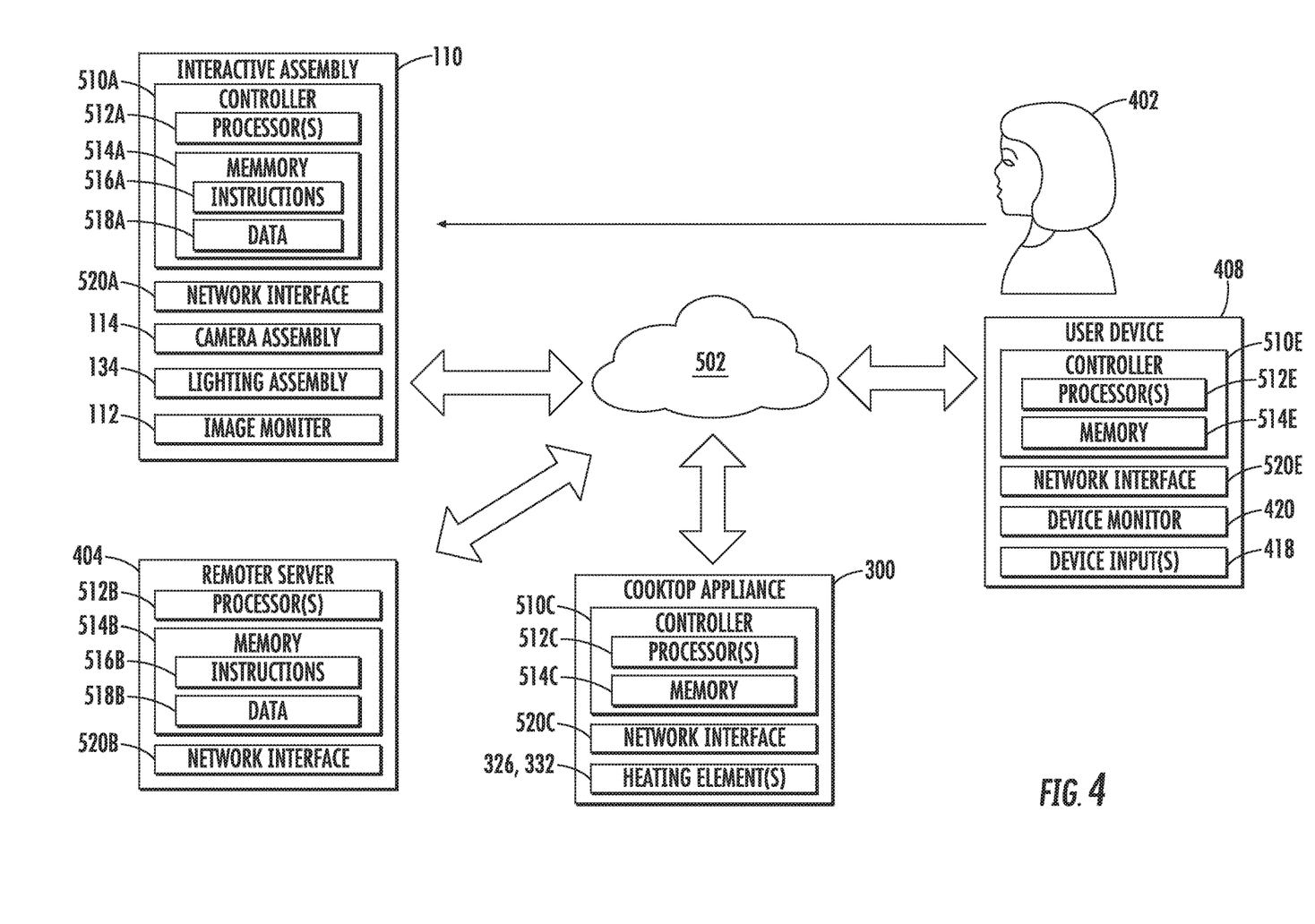
FIG. 4 provides a schematic view of a system for user engagement according to exemplary embodiments of the present disclosure.

In some embodiments, controller 510C includes one or more memory devices 514C and one or more processors 512C (FIG. 4). The processors 512C can be any combination of general or special purpose processors, CPUs, or the like that can execute programming instructions or control code associated with operation of cooking appliance 300. The memory devices 514C (i.e., memory) may represent random access memory such as DRAM or read only memory such as ROM or FLASH. In one embodiment, the processor 512C executes programming instructions stored in memory 514C. The memory 514C may be a separate component from the processor 512C or may be included onboard within the processor 512C. Alternatively, controller 510C may be constructed without using a processor, for example, using a combination of discrete analog or digital logic circuitry (such as switches, amplifiers, integrators, comparators, flip-flops, AND gates, and the like) to perform control functionality instead of relying upon software.

In certain embodiments, controller 510C includes a network interface 520C (FIG. 4) such that controller 510C can connect to and communicate over one or more networks (e.g., network 502—FIG. 4) with one or more network nodes. Controller 510C can also include one or more transmitting, receiving, or transceiving components for transmitting/receiving communications with other devices communicatively coupled with cooking appliance 300. Additionally or alternatively, one or more transmitting, receiving, or transceiving components can be located off board controller 510C. Generally, controller 510C can be positioned in any suitable location throughout cooking appliance 300. For example, controller 510C may be located proximate user interface panel 334 toward the front portion of cooking appliance 300.

As shown, one or more casings (e.g., hood casing 116) may be provided above cooking appliance 300 along the vertical direction V. For example, a hood casing 116 may be positioned above cooking appliance 300 in a stationary mounting (e.g., such that operation of interactive assembly 110 is not permitted unless casing 116 is mounted at a generally fixed or non-moving location). Hood casing 116 includes a plurality of outer walls and generally extends along the vertical direction V between a top end 118 and a bottom end 120; along the lateral direction L between a first side end 122 and a second side end 124; and along the transverse direction T between a front end 126 and a rear end 128. In some embodiments, hood casing 116 is spaced apart from cooktop surface 324 along the vertical direction V. An open region 130 may thus be defined along the vertical direction V between cooktop surface 324 and bottom end 120.

In optional embodiments, hood casing 116 is formed as a range hood. A ventilation assembly within hood casing 116 may thus direct an airflow from the open region 130 and through hood casing 116. However, a range hood is provided by way of example only. Other configurations may be used within the spirit and scope of the present disclosure. For example, hood casing 116 could be part of a microwave or other appliance designed to be located above cooking appliance 300 (e.g., directly above cooktop surface 324). Moreover, although a generally rectangular shape is illustrated, any suitable shape or style may be adapted to form the structure of hood casing 116.

In certain embodiments, one or more camera assemblies 114A, 114B are provided to capture images (e.g., static images or dynamic video) of a portion of cooking appliance 300 or an area adjacent to cooking appliance 300. Generally, each camera assembly 114A, 114B may be any type of device suitable for capturing a picture or video. As an example, each camera assembly 114A, 114B may be a video camera or a digital camera with an electronic image sensor [e.g., a charge coupled device (CCD) or a CMOS sensor]. A camera assembly 114A or 114B is generally provided in operable communication with controller 510A such that controller 510A may receive an image signal from camera assembly 114A or 114B corresponding to the picture captured by camera assembly 114A or 114B. Once received by controller 510A, the image signal may be further processed at controller 510A or transmitted to a separate device (e.g., remote server 404—FIG. 4) in live or real-time for remote viewing (e.g., via one or more social media platforms). Optionally, one or more microphones (not pictured) may be associated with one or more of the camera assemblies 114A, 114B to capture and transmit audio signal(s) coinciding (or otherwise corresponding) with the captured image signal(s).

In some embodiments, one camera assembly (e.g., first camera assembly 114A) is directed at cooktop surface 324. In other words, first camera assembly 114A is oriented to capture light emitted or reflected from cooktop surface 324 through the open region 130. Thus, first camera assembly 114A may selectively capture an image covering all or some of cooktop surface 324. For instance, first camera assembly 114A may capture an image covering one or more heating elements 326 of cooking appliance 300. Optionally, first camera assembly 114A may be directed such that a line of sight is defined from first camera assembly 114A that is perpendicular to cooktop surface 324.

As shown, first camera assembly 114A is positioned above cooktop surface 324 (e.g., along the vertical direction V). In some such embodiments, first camera assembly 114A is mounted (e.g., fixedly or removably) to hood casing 116.

A cross-brace 132 extending across hood casing 116 (e.g., along the transverse direction T) may support first camera assembly 114A. When assembled, first camera assembly 114A may be positioned directly above cooktop surface 324.

In additional or alternative embodiments, one camera assembly (e.g., second camera assembly 114B) is directed away from cooktop surface 324. In other words, second camera assembly 114B is oriented to capture light emitted or reflected from an area other than cooktop surface 324. In particular, second camera assembly 114B may be directed at the area in front of cooking appliance 300 (e.g., directly forward from cooking appliance 300 along the transverse direction T). Thus, second camera assembly 114B may selectively capture an image of the area in front of cooktop surface 324. This area may correspond to or cover the location where a user would stand during use of cooking appliance 300. During use, a user's face or body may be captured by second camera assembly 114B while the user is standing directly in front of cooking appliance 300. Optionally, second camera assembly 114B may be directed such that a line of sight is defined from second camera assembly 114B that is non-orthogonal to cooktop surface 324 (e.g., between 0° and 45° relative to a plane parallel to cooktop surface 324). The captured images from second camera assembly 114B may be suitable for transmission to a remote device or may be processed as part of one or more operations of interactive assembly 110, such as a gesture control signal for a portion of interactive assembly 110 (e.g., to engage a graphical user interface displayed at image monitor 112).

As shown, second camera assembly 114B is positioned above cooking appliance 300 (e.g., along the vertical direction V). In some such embodiments, such as that illustrated in FIGS. 1 and 2, second camera assembly 114B is mounted (e.g., fixedly or removably) to a front portion of hood casing 116 (e.g., at image monitor 112). When assembled, second camera assembly 114B may be positioned directly above a portion of cooking appliance 300 (e.g., cooktop surface 324) or, additionally, forward from cooking appliance 300 along the transverse direction T.

In optional embodiments, a lighting assembly 134 is provided above cooktop surface 324 (e.g., along the vertical direction V). For instance, lighting assembly 134 may be mounted to hood casing 116 (e.g., directly above cooktop surface 324). Generally, lighting assembly 134 includes one or more selectable light sources directed toward cooktop surface 324. In other words, lighting assembly 134 is oriented to project a light (as indicated at arrows 136) to cooking appliance 300 through open region 130 and illuminate at least a portion of cooktop surface 324. The light sources may include any suitable light-emitting elements, such as one or more light emitting diode (LED), incandescent bulb, fluorescent bulb, halogen bulb, etc.

During use, lighting assembly 134 may be selectively activated to illuminate a portion of cooking appliance 300 (e.g., cooktop surface 324) based on a received light visibility signal. For instance, lighting assembly 134 may be activated by controller 510A based on direct user input (e.g., depressing a dedicated switch, a gesture control signal, voice control signal, etc.). In other words, the light visibility signal may be an isolated user input signal.

Alternatively, the light visibility signal may be an automatically-generated signal that does not require direct user input. The light visibility signal may indicate additional light is needed above cooking appliance 300. In turn, controller 510A may automatically activate lighting assembly 134 based on a determined condition. Optionally, controller 510A may vary the activation or light intensity (i.e., luminance) of the light 136 from lighting assembly 134 based on the ambient conditions (e.g., through the open region 130 between cooktop surface 324 and hood casing 116). For instance, an ambient light sensor 115 may be positioned above cooktop surface 324 (e.g., directly above cooktop surface 324). In some such embodiments, ambient light sensor 115 detects the light available at first camera assembly 114A and transmits a corresponding light visibility signal to controller 510A. Based on the received light visibility signal, controller 510A may direct lighting assembly 134 to activate/deactivate or increase/decrease the intensity of light 136 projected towards cooking appliance 300.

In some embodiments, image monitor 112 is provided above cooktop surface 324 (e.g., along the vertical direction V). For instance, image monitor 112 may be mounted to hood casing 116 (e.g., above cooking appliance 300). Generally, image monitor 112 may be any suitable type of mechanism for visually presenting a digital (e.g., interactive) image. For example, image monitor 112 may be a liquid crystal display (LCD), a plasma display panel (PDP), a cathode ray tube (CRT) display, etc. Thus, image monitor 112 includes an imaging surface 138 (e.g., screen or display panel) at which the digital image is presented or displayed as an optically-viewable picture (e.g., static image or dynamic video) to a user. The optically-viewable picture may correspond to any suitable signal or data received or stored by interactive assembly 110 (e.g., at controller 510A). As an example, image monitor 112 may present notices or messages in the form of viewable text or images. As another example, image monitor 112 may present a remotely captured image, such as a live (e.g., real-time) dynamic video stream received from a separate user or device. As yet another example, image monitor 112 may present a graphical user interface (GUI) that allows a user to select or manipulate various operational features of interactive assembly 110 or cooking appliance 300. During use of such GUI embodiments, a user may engage, select, or adjust the image presented at image monitor 112 through any suitable input, such as gesture controls detected through second camera assembly 114B, voice controls detected through one or more microphones, associated touch panels (e.g., capacitance or resistance touch panel) or sensors overlaid across imaging surface 138, etc.

As illustrated, the imaging surface 138 generally faces, or is directed away from, cooking appliance (e.g., cooktop surface 324 or cabinet 310). In particular, the imaging surface 138 is directed toward the area forward from the cooking appliance 300. During use, a user standing in front of cooking appliance 300 may thus see the optically-viewable picture (e.g., recipe, dynamic video stream, graphical user interface, etc.) displayed at the imaging surface 138. Optionally, the imaging surface 138 may be positioned at a rearward non-orthogonal angle relative to the vertical direction. In other words, the imaging surface 138 may be inclined such that an upper edge of the imaging surface 138 is closer to the rear end 128 of hood casing 116 than a lower edge of the imaging surface 138 is. In some such embodiments, the non-orthogonal angle is between 1° and 15° relative to the vertical direction V. In certain embodiments, the non-orthogonal angle is between 2° and 7° relative to the vertical direction V.

FIG. 4 provides a schematic view of a system for user engagement according to exemplary embodiments of the present disclosure. As shown, interactive assembly 110 can be communicatively coupled with network 502 and various other nodes, such as a remote server 404, cooking appliance 300, and one or more user devices 408. Moreover, one or more users 402 can be in operative communication with interactive assembly 110 by various methods, including voice control or gesture recognition, for example. Additionally, or alternatively, although network 502 is shown, one or more portions of the system (e.g., interactive assembly 110, cooking appliance 300, user device 408, or other devices within system) may be communicatively coupled without network 502; rather, interactive assembly 110 and various other devices of the system can be communicatively coupled via any suitable wired or wireless means not over network 502, such as, for example, via physical wires, transceiving, transmitting, or receiving components.

As noted above, interactive assembly 110 may include a controller 510A operably coupled to one or more camera assemblies 114, lighting assemblies 134, and image monitors 110. Controller 510A may include one or more processors 512A and one or more memory devices 514A (i.e., memory). The one or more processors 512A can be any suitable processing device (e.g., a processor core, a microprocessor, an ASIC, a FPGA, a microcontroller, etc.) and can be one processor or a plurality of processors that are operatively connected. The memory device 514A can include one or more non-transitory computer-readable storage mediums, such as RAM, ROM, EEPROM, EPROM, flash memory device, magnetic disks, etc., and combinations thereof. The memory devices 514A can store data 518A and instructions 516A that are executed by the processor 512A to cause interactive assembly 110 to perform operations. For example, instructions 516A could be instructions for voice recognition, instructions for gesture recognition, receiving/transmitting images or image signals from camera assembly 114, directing activation of lighting assembly 134, or projecting images at image monitor 112. The memory devices 514A may also include data 518A, such as captured image data, notification or message data, etc., that can be retrieved, manipulated, created, or stored by processor 512A.

Controller 510A includes a network interface 520A such that interactive assembly 110 can connect to and communicate over one or more networks (e.g., network 502) with one or more network nodes. Network interface 520A can be an onboard component of controller 510A or it can be a separate, off board component. Controller 510A can also include one or more transmitting, receiving, or transceiving components for transmitting/receiving communications with other devices communicatively coupled with interactive assembly 110. Additionally or alternatively, one or more transmitting, receiving, or transceiving components can be located off board controller 510A.

Network 502 can be any suitable type of network, such as a local area network (e.g., intranet), wide area network (e.g., internet), low power wireless networks [e.g., Bluetooth Low Energy (BLE)], or some combination thereof and can include any number of wired or wireless links. In general, communication over network 502 can be carried via any type of wired or wireless connection, using a wide variety of communication protocols (e.g., TCP/IP, HTTP, SMTP, FTP), encodings or formats (e.g., HTML, XML), or protection schemes (e.g., VPN, secure HTTP, SSL).

In some embodiments, a remote server 404, such as a web server, is in operable communication with interactive assembly 110. The server 404 can be used to host a social media platform (e.g., FACEBOOK™, INSTAGRAM™, SNAPCHAT™, TWITTER™, etc.). In other words, remote server 404 may be a social media platform server. Additionally or alternatively, the server 404 can be used to host an information database. The server can be implemented using any suitable computing device(s). The server 404 may include one or more processors 512B and one or more memory devices 514B (i.e., memory). The one or more processors 512B can be any suitable processing device (e.g., a processor core, a microprocessor, an ASIC, a FPGA, a microcontroller, etc.) and can be one processor or a plurality of processors that are operatively connected. The memory device 512B can include one or more non-transitory computer-readable storage mediums, such as RAM, ROM, EEPROM, EPROM, flash memory devices, magnetic disks, etc., and combinations thereof. The memory devices 514B can store data 518B and instructions 516B which are executed by the processor 512B to cause remote server 404 to perform operations. For example, instructions 516B could be instructions for receiving/transmitting images or image signals, transmitting/receiving recipe signals, etc.

The memory devices 514B may also include data 518B, such as social media data, notification data, message data, image data, etc., that can be retrieved, manipulated, created, or stored by processor 512B. The data 518B can be stored in one or more databases. The one or more databases can be connected to remote server 404 by a high bandwidth LAN or WAN, or can also be connected to remote server 404 through network 502. The one or more databases can be split up so that they are located in multiple locales.

Remote server 404 includes a network interface 520B such that interactive remote server 404 can connect to and communicate over one or more networks (e.g., network 502) with one or more network nodes. Network interface 520B can be an onboard component or it can be a separate, off board component. In turn, remote server 404 can exchange data with one or more nodes over the network 502. In particular, remote server 404 can exchange data with interactive assembly 110. Although not pictured, it is understood that remote server 404 may further exchange data with any number of client devices over the network 502. The client devices can be any suitable type of computing device, such as a general purpose computer, special purpose computer, laptop, desktop, integrated circuit, mobile device, smartphone, tablet, or other suitable computing device. In the case of a social media platform, images (e.g., static images or dynamic video), audio, or text may thus be exchanged between interactive assembly 110 and various separate client devices through remote server 404.

In optional embodiments, cooking appliance 300 is in operable communication with interactive assembly 110 via network 502. In turn, controller 510C of cooking appliance 300 may exchange signals with interactive assembly 110. Optionally, one or more portions of cooking appliance 300 may be controlled according to signals received from controller 510A of interactive assembly 110. For instance, one or more heating elements 326, 332 of cooking appliance 300 may be activated or directed to a specific heat output (e.g., in units of British Thermal Units or temperature) based on one or more instruction signals received from controller 510A of interactive assembly 110 or remote server 404.

In certain embodiments, a user device 408 is communicatively coupled with network 502 such that user device 408 can communicate with interactive assembly 110. User device 408 can communicate directly with interactive assembly 110 via network 502. Alternatively, user 402 can communicate indirectly with interactive assembly 110 by communicating via network 502 with remote server 404, which in turn communicates with interactive assembly 110 via network 502. Moreover, user 402 can be in operative communication with user device 408 such that user 402 can communicate with interactive assembly 110 via user device 408.

User device 408 can be any type of device, such as, for example, a personal computing device (e.g., laptop or desktop), a mobile computing device (e.g., smartphone or tablet), a gaming console or controller, a wearable computing device, an embedded computing device, a remote, or any other suitable type of user computing device. User device 408 can include one or more user device controllers 510E. Controller 510E can include one or more processors 512E and one or more memory devices 514E. The one or more processors 512E can be any suitable processing device (e.g., a processor core, a microprocessor, an ASIC, a FPGA, a controller, a microcontroller, etc.) and can be one processor or a plurality of processors that are operatively connected. The memory device (i.e., memory) can include one or more non-transitory computer-readable storage mediums, such as RAM, ROM, EEPROM, EPROM, flash memory devices, magnetic disks, etc., and combinations thereof. The memory can store data and instructions which are executed by the processor 512E to cause user device 408 to perform operations. Controller 510E a user device network interface 520E such that user device 408 can connect to and communicate over one or more networks (e.g., network 502) with one or more network nodes. Moreover, controller 510E may be able to receive or transmit one or more messages (e.g., SMS message, social media alert or post, email, etc.) over one or more networks, such as network 502 or an additional or alternative network. Network interface 520E can be an onboard component of controller 510E or it can be a separate, off board component. Controller 510E can also include one or more transmitting, receiving, or transceiving components for transmitting/receiving communications with other devices communicatively coupled with user device 408. Additionally or alternatively, one or more transmitting, receiving, or transceiving components can be located off board controller 510E.

User device 408 can include one or more user inputs 418 such as, for example, buttons, one or more cameras, or a monitor 420 configured to display graphical user interfaces or other visual representations to user. For example, display can display graphical user interfaces corresponding to operational features of interactive assembly 110 such that user may manipulate or select the features to operate interactive assembly 110. Display can be a touch sensitive component (e.g., a touch-sensitive display screen or a touch pad) that is sensitive to the touch of a user input object (e.g., a finger or a stylus). For example, a user may touch the display with his or her finger and type in a series of numbers on the display. In addition, motion of the user input object relative to the display can enable user to provide input to user device 408. User device 408 may provide other suitable methods for providing input to user device 408 as well. Moreover, user device 408 can include one or more speakers, one or more cameras, or more than one microphones such that user device 408 is configured with voice control, motion detection, and other functionality.

Generally, user 402 may be in operative communication with interactive assembly 110, cooking appliance 300, or one or more user devices 408. In some exemplary embodiments, user 402 can communicate with devices (e.g., interactive assembly 110) using voice control. User 402 may also be in operative communication via other methods as well, such as visual communication.

Figure 5:
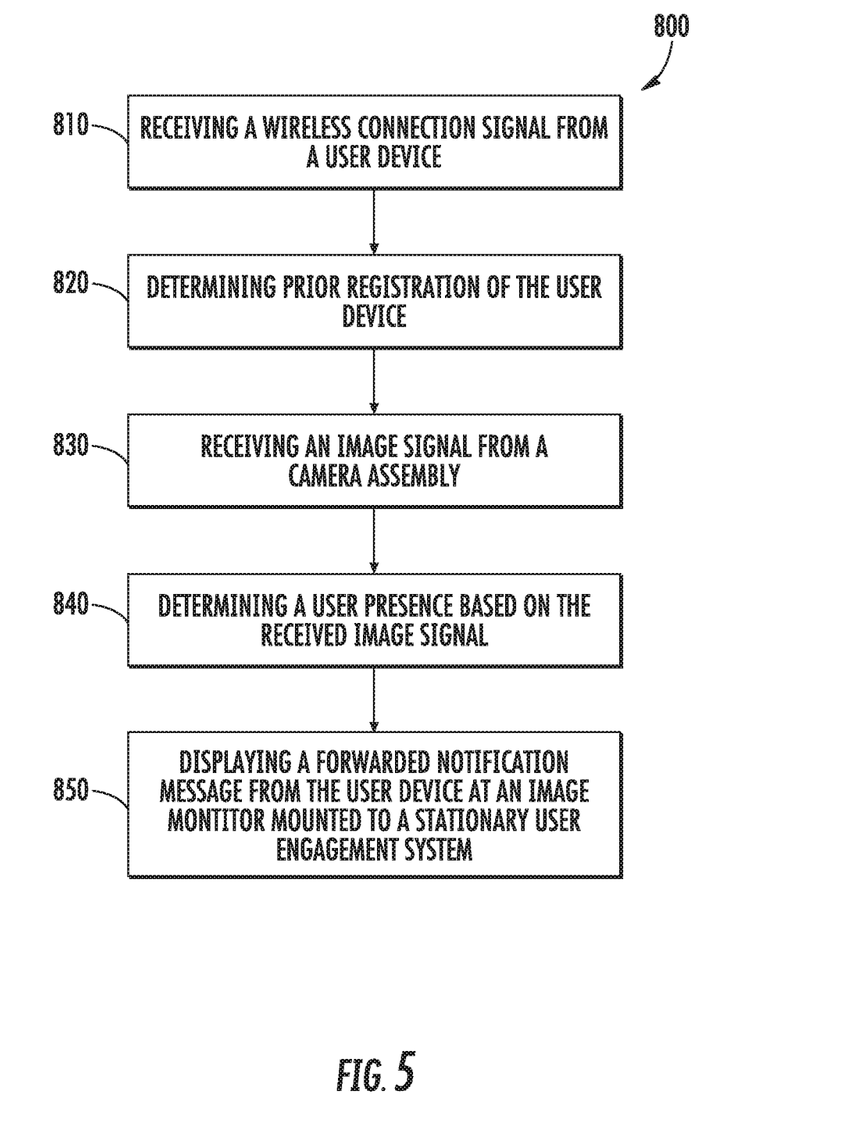
FIG. 5 provides a flow chart illustrating a method of operating a system according to exemplary embodiments of the present disclosure.
Figure 6:
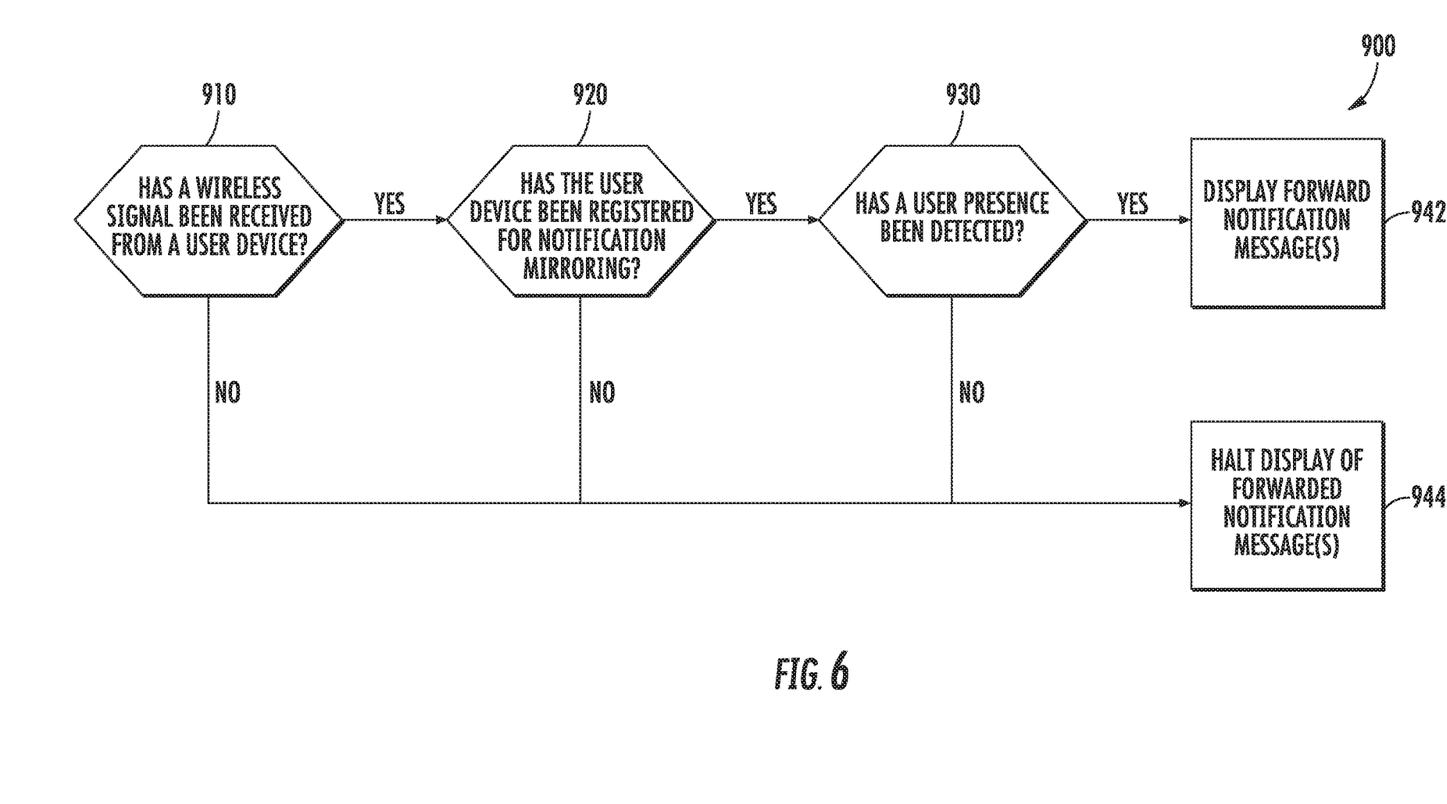
FIG. 6 provides a flow chart illustrating a method of operating a system according to exemplary embodiments of the present disclosure.

Referring now to FIGS. 5 and 6, various methods may be provided for use with system 100 (FIG. 1) in accordance with the present disclosure. In general, the various steps of methods as disclosed herein may, in exemplary embodiments, be performed by the controller 510A (FIG. 4) as part of an operation that the controller 510A is configured to initiate (e.g., a message-display operation). During such methods, controller 510A may receive inputs and transmit outputs from various other components of the system 100. For example, controller 510A may send signals to and receive signals from remote server 404, cooking appliance 300, or user device 408, as well as other components within interactive assembly 110 (FIG. 4). In particular, the present disclosure is further directed to methods, as indicated by 800 and 900, for operating system 100. Such methods advantageously facilitate sharing or displaying notifications (e.g., text, static images, dynamic video, etc.) adjacent to cooking appliance 300 from, for example, user device 408. In certain embodiments, such methods may advantageously facilitate the presentation or display of notifications only when viewable by an identified user (e.g., without requiring resource-intensive methods, such as facial recognition algorithms). Additionally or alternatively, such methods may advantageously ensure privacy and prevent non-intended parties from viewing the notifications.

FIGS. 5 and 6 depict steps performed in a particular order for purpose of illustration and discussion. Those of ordinary skill in the art, using the disclosures provided herein, will understand that (except as otherwise indicated) the steps of any of the methods disclosed herein can be modified, adapted, rearranged, omitted, or expanded in various ways without deviating from the scope of the present disclosure. Moreover, although described separately with respect to FIGS. 5 and 6, is understood that the methods 800 and 900 are not mutually exclusive and may include one or more steps of the other.

Turning especially to FIG. 5, at 810, the method 800 includes receiving a wireless connection signal from a user device. In particular, the wireless connection signal may be received at a stationary portion of the system (e.g., the interactive assembly). For instance, the user device and interactive assembly may be in wireless communication over a BLE band (e.g., using short-wavelength UHF radio waves in the ISM band from 2.4 to 2.485 GHz). Thus, the wireless connection signal may be Bluetooth signal establishing a wireless connection between the user device and interactive assembly, as would be understood.

At 820, the method 800 includes determining prior registration of the user device subsequent to receiving the wireless connection signal at 810. In particular, prior registration may be determined at the interactive assembly. In some such embodiments, the interactive assembly (e.g., controller thereof) may compare a programmed Bluetooth address of the user device with a recorded list of approved addresses. For instance, the Bluetooth address of user device may be included with the wireless connection signal at 810. A recorded list of approved addresses may be stored on the controller of the interactive assembly. Moreover, the recorded list may include one or more Bluetooth addresses that correspond to user devices that had been previously registered with the interactive assembly (e.g., Bluetooth addresses that the system has already recorded device registration for). Thus, the system may ensure that the user device is a registered or approved device to communicate with the interactive assembly.

In certain embodiments, the user device may be registered with the interactive assembly prior to 820 or 810 (e.g., such that the wireless connection at 810 is established without direct input or commands from a user). For instance, before 820, the interactive assembly may display a device identifier at the image monitor. The device identifier may correspond to a programmed name or Bluetooth address stored on the user device. Subsequently, the interactive assembly may receive a confirmation signal, such as from a user input. The user input may, for example, be manual selection from a user at the interactive assembly confirming the identified user device is a recognized device that the user intends to register with the interactive assembly. In response to the user's confirmation (i.e., confirmation signal), the system may record device registration (e.g., at the interactive assembly). Thus, the user device may be registered with the interactive assembly. After registering the user device once, the user may utilize the system without having to register the device again.

At 830, the method 800 includes receiving an image signal from a camera assembly. In some embodiments, the image signal received at 830 may be received subsequent to determining prior registration at 820. Additionally or alternatively, the image signal may be received at the controller of the interactive assembly. As described above, the camera assembly (e.g., the second camera assembly) may be directed toward an area in front of the cooking appliance and the interactive assembly. For instance, the camera assembly may be mounted to the interactive assembly at a front portion thereof. Thus, the image signal received at 830 may generally correspond to or provide a picture of the area in front of the interactive assembly. If a user is standing in front of the interactive assembly or cooking appliance, that user may be captured in the picture (e.g., image signal) from the camera assembly. Advantageously, the system may have a visual indication that the user is positioned in view of the image monitor of the interactive assembly. Optionally, at least a portion of the image monitor may provide a real time video feed for the camera assembly. In other words, the image monitor may mirror what images or image signals are captured by camera assembly. A user may thus have an immediate visible indication of what the camera assembly "sees" (i.e., detects) and what information is included in the image signal received at 830.

At 840, the method 800 includes determining a user presence based on the received image signal. In certain embodiments, the controller of the interactive assembly evaluates the received image signal in order to find an indication that the user was or is positioned in front of the camera assembly and image monitor. Optionally, 840 may limit the determination to a general indication that a human form was captured in the received image signal. In some such embodiments, 840 includes determining a human form outline (e.g., a single human form outline) from the received image signal. Furthermore, the determination may require that only a single human form outline is detected (e.g., such that multiple human form outlines or a multiple user presence is not detected). As is understood, the human form outline determination may be made by edge matching, divide-and-conquer search, greyscale matching, histograms of receptive field responses, or another suitable routine.

Advantageously, the determination at 840 may be made without requiring a resource intensive routine or algorithm for identifying a specific human being, such as one that is based exclusively on visual information (e.g., a facial recognition algorithm).

Under certain conditions, the interactive assembly may be unable to determine a user presence based on a single received image signal. The method 800 may further provide for receiving multiple image signals (e.g., a first image signal and a second image signal that is captured and received subsequent to the first image signal). In some such embodiments, the image signal received at 840 is a second image signal. The method 800 may thus include receiving a first image signal prior to receiving the second image signal, and then failing to determine a user presence based on the first image signal. Receiving a second image signal may be contingent upon failing to determine the user presence based on the first image signal. Moreover, receiving a second image signal may occur in response to failing to determine the user presence based on the first image signal.

At 850, the method 800 includes displaying a forwarded notification message from the user device at the image monitor. The forwarded notification message may include or be provided as text data, media (e.g., static or dynamic pictures) data, sound data, etc. For instance, the forwarded notification message may provide an SMS message, social media alert or post, email, alarm, or any other suitable temporal notification received at the user device prior to being forwarded to the interactive assembly. In some embodiments, displaying the forwarded notification message at 850 is subsequent to determining the user presence at 840. Thus, 850 may be contingent upon both determining a registered user device is in close proximity to the interactive assembly (e.g., at 810 and 820) and that a user is present in front of the image monitor (e.g., at 840).

The method 800 may provide a suitable indication that a specific user is positioned in view of the image monitor of the interactive assembly and can, therefore, read or received the forwarded notification message. Advantageously, the method 800 may thus ensure notification messages are shown to a specific intended user.

In some embodiments, displaying the forwarded notification message 850 can occur automatically (e.g., without further user input). In alternative embodiments, displaying a forwarded notification message at 850 requires confirmation from the user, such as requiring the user to select the forwarded notification at the interactive assembly (e.g., depressing a button or engaging a touchscreen of the interactive assembly). Additionally or alternatively, 850 may require determining a message forwarding setting has been selected for the user device. Such a determination may be made at the interactive assembly (e.g., based on the wireless connection signal from the user device) or at the user device itself.

Although described in the context of a single forwarded notification message, is understood that the method 800 may include or provide for multiple forwarded medication messages that are received at different points in time. The forwarded notification message at 850 may thus be a first notification message. Moreover, the image signal received at 830 may be a first image signal. In some such embodiments, the method 800 includes receiving a second notification message forwarded from the user device. The method 800 may include affirming (e.g., determining again) prior registration of the user device subsequent to receiving the second notification message. In some such embodiments, method 800 further includes receiving a second image signal from the camera assembly subsequent to affirming prior registration. Moreover, the method may include redetermining user presence based on the image signal (e.g., in order to ensure that the user is again present in front of the interactive assembly). Subsequent to redetermining the user presence, the method 800 may include displaying the second notification message at the image monitor.

In certain embodiments, the method 800 requires that certain steps occur in a specific order or within a predetermined time period (e.g., amount of time). As an example, method 800 may include receiving the forwarded notification message at 850 prior to (i.e., before) receiving the image signal at 830. Additionally or alternatively, determining the user presence at 840 may be required to occur within a predetermined time period following receiving the forwarded notification message at 850. If the determination of the user presence cannot be made within the predetermined time period (e.g., because the user is not present in front of the camera assembly), the method may time out (e.g., end prematurely) or prevent the forwarded notification message from being displayed at the image monitor.

In further embodiments, the method 800 may require the user's continued presence in front of the interactive assembly in order to continue displaying forwarded notification messages from the user device. For instance, the camera assembly may receive multiple sequential image signals (e.g., at a predetermined time interval). In some such embodiments, the image signal received at 830 is a first image signal and the method 800 further includes receiving a second image signal from the camera assembly subsequent to (i.e., after) receiving the first image signal. The method 800 may also include determining a non-user presence based on the received second image signal (e.g., the absence of any user or human form within the image of the second image signal). If a non-user presence is determined, method 800 may include halting display of forwarded notification messages at the image monitor (e.g., in response to determining the non-user presence). Thus, the method 800 may prevent any forwarded notification messages from being displayed when a non-user presence is determined.

In still further embodiments, the method 800 may require that only a single user be present in front of the interactive assembly in order to continue displaying forwarded notification messages from the user device. For instance, the camera assembly may receive multiple sequential image signals (e.g., at a predetermined time interval). In some such embodiments, the image signal received at 830 is a first image signal and the method 800 further includes receiving a second image signal from the camera assembly subsequent to (i.e., after) receiving the first image signal. The method 800 may also include determining a multiple user presence based on the received second image signal (e.g., the presence of multiple users or human forms within the image of the second image signal). If a multiple user presence is determined, method 800 may include halting display of forwarded notification messages at the image monitor (e.g., in response to determining the non-user presence). Thus, the method 800 may prevent any forwarded notification messages from being displayed when a non-user presence is determined.

Turning now to FIG. 6, the method 900 provides multiple contingent steps (e.g., at 910, 920, and 930) for displaying forwarded notification messages (e.g., at 942). Generally, the method 900 requires each contingent step be met in order to display a forwarded notification message. For instance, the method 900 may require each contingent step to result in a "yes" determination. However, if one or more contingent step is not met (e.g., a "no" determination is made), the method 900 may include halting display of forwarded medication messages (e.g., at 944). Optionally, the multiple contingent steps may be repeated or reevaluated (e.g., at a predetermined time interval, in response to receiving the forwarded notification message from the user device, or according to any other suitable condition).

At 910, the method 900 includes determining if a wireless connection signal has been received from the user device. In particular, the wireless connection signal may be received at a stationary portion of the system (e.g., the interactive assembly). For instance, the user device and interactive assembly may be in wireless communication over a BLE band (e.g., using short-wavelength UHF radio waves in the ISM band from 2.4 to 2.485 GHz). Thus, the wireless connection signal may be Bluetooth signal establishing a wireless connection between the user device and interactive assembly, as would be understood.

At 920, the method 900 includes determining if the user device has been registered for notification mirroring. In some embodiments, 920 includes determining prior registration of the user device subsequent to receiving the wireless connection signal at 910. In particular, prior registration may be determined at the interactive assembly immediately following 910 or in response to a "yes" determination at 910. In some such embodiments, the interactive assembly (e.g., controller thereof) may compare a programmed Bluetooth address of the user device with a recorded list of approved addresses. For instance, a Bluetooth address of user device may be included with the wireless connection signal at 910. A recorded list of approved addresses may be stored on the controller of the interactive assembly. Moreover, the recorded list may include one or more Bluetooth addresses that correspond to user devices that had been previously registered with the interactive assembly (e.g., Bluetooth addresses for which that the system recorded device registration). Thus, the system may ensure that the user device is a registered or approved device to communicate with interactive assembly.

At 930, the method 900 includes determining if a user presence has been detected. In some embodiments, 930 includes determining a user presence based on a received image signal (e.g., as described above). In certain embodiments, the controller of the interactive assembly evaluates the received image signal in order to find an indication that the user was or is positioned in front of the camera assembly image monitor. Optionally, 930 may limit the determination to a general indication that a human form was captured and received image signal. In some such embodiments, 930 includes determining if a human form outline is detectable. As is understood, such a determination or detection may be made by edge matching, divide-and-conquer search, greyscale matching, histograms of receptive field responses, or another suitable routine. Optionally, 930 may require or permit that only a single user (e.g., a single human form outline) be detected in order to make a "yes" determination. Detection of multiple users or the absence of the user may thus result in a "no" determination at 930.

In response to a "yes" determination at each of 910, 920, and 930, the method 900 may proceed to 942. At 942, the method 900 includes displaying one or more forwarded notification messages from the user device at the image monitor of the interactive assembly. The forwarded notification message may include or be provided as text data, media (e.g., static or dynamic pictures) data, sound data, etc. For instance, the forwarded notification message may provide an SMS message, social media alert or post, email alarm, or any other suitable temporal notification received at the user device prior to being forwarded to the interactive assembly.

In response to a "no" determination at one or more of 910, 920, or 930, the method 900 may proceed to 944. At 944, method 900 includes halting display of forwarded notification messages at the image monitor of the interactive assembly. Thus, any forwarded notification message received at the interactive assembly may be prevented from being displayed at the image monitor of the interactive display when one or more of conditions of 910, 920, or 930 are not met.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of operating a user engagement system comprising a stationary interactive assembly, the method comprising:
    receiving a wireless connection signal from a user device at the stationary interactive assembly establishing a wireless connection between the user device and the stationary interactive assembly;
    determining prior registration of the user device at the stationary interactive assembly subsequent to receiving the wireless connection signal;
    receiving an image signal from a camera assembly mounted to the stationary interactive assembly subsequent to determining prior registration;
    determining a user presence based on the received image signal; and
    displaying a forwarded notification message from the user device at an image monitor mounted to the stationary interactive assembly subsequent to determining the user presence,
    wherein the forwarded notification message is received at the stationary interactive assembly prior to receiving the image signal, and wherein the forwarded notification comprises a message received at the user device prior to being forwarded to the stationary interactive assembly.

2. The method of claim 1, further comprising:
    displaying a device identifier at the image monitor before determining prior registration;
    receiving a confirmation signal from a user input at the stationary engagement assembly subsequent to displaying the device identifier; and
    recording device registration at the stationary interactive assembly in response to receiving the confirmation signal.

3. The method of claim 1, wherein the image monitor is mounted above a cooking appliance.

4. The method of claim 1, wherein the image signal is a first image signal, the method further comprising:
    receiving a second image signal from the camera assembly mounted to the stationary interactive assembly subsequent to receiving the first image signal;
    determining a non-user presence based on the received second image signal; and
    halting display of forwarded notification messages at the image monitor in response to determining the non-user presence.

5. The method of claim 1, wherein the image signal is a first image signal, the method further comprising:
    receiving a second image signal from the camera assembly mounted to the stationary interactive assembly subsequent to receiving the first image signal;
    determining a multiple user presence based on the received second image signal; and halting display of forwarded notification messages at the image monitor in response to determining the multiple user presence.

6. The method of claim 1, wherein determining a user presence comprises determining a human-form outline.

7. The method of claim 1, wherein the image signal is a first image signal, wherein the forward notification message is a first notification message, the method further comprising:
receiving a second notification message forwarded from the user device;
affirming prior registration of the user device at the stationary interactive assembly subsequent to receiving the second notification message;
receiving a second image signal from the camera assembly mounted to the stationary interactive assembly subsequent to affirming prior registration;
redetermining a user presence based on the received second image signal; and
displaying the second notification message at the image monitor mounted to the stationary interactive assembly subsequent to redetermining the user presence.

8. The method of claim 1, wherein determining prior registration of the user device comprises comparing a Bluetooth address of the user device with a recorded list of approved addresses.

9. The method of claim 1, further comprising receiving the forwarded notification message from the user device prior to receiving the image signal, wherein the determining the user presence occurs within a predetermined time period following receiving the forwarded notification message.

10. The method of claim 1, wherein the image signal is a second image signal, and wherein the method further comprises:
receiving a first image signal prior to receiving the second image signal; and
failing to determine a user presence based on the first image signal, wherein receiving the second image signal occurs in response to failing to determine the user presence based on the first image signal.

11. A user engagement system for a user device and a cooking appliance comprising a cabinet defining a vertical direction, a lateral direction, and a transverse direction, the user engagement system comprising:
a camera assembly mounted in a fixed position and directed away from the cabinet;
an image monitor directed away from the cabinet; and
a controller in operative communication with the user device, the camera assembly, and the image monitor, the controller being configured to initiate a message-display operation, the message-display operation comprising
receiving a wireless connection signal from the user device establishing a wireless connection between the user device and the controller,
determining prior registration of the user device subsequent to receiving the wireless connection signal,
receiving an image signal from the camera assembly subsequent to determining prior registration,
determining a user presence based on the received image signal, and
displaying a forwarded notification message from the user device at the image monitor subsequent to determining the user presence,
wherein the forwarded notification message is received at the controller prior to receiving the image signal, and wherein the forwarded notification comprises a message received at the user device prior to being forwarded to the controller.

12. The user engagement system of claim 11, wherein the message-display operation further comprises
displaying a device identifier at the image monitor before determining prior registration,
receiving a confirmation signal from a user input subsequent to displaying the device identifier, and
recording device registration in response to receiving the confirmation signal.

13. The user engagement system of claim 11, wherein the image monitor is mounted above a cooking appliance.

14. The user engagement system of claim 11, wherein the image signal is a first image signal, and wherein the message-display operation further comprises
receiving a second image signal from the camera assembly subsequent to receiving the first image signal,
determining a non-user presence based on the received second image signal, and
halting display of forwarded notification messages at the image monitor in response to determining the non-user presence.

15. The user engagement system of claim 11, wherein the image signal is a first image signal, and wherein the message-display operation further comprises
receiving a second image signal from the camera assembly subsequent to receiving the first image signal,
determining a multiple user presence based on the received second image signal, and
halting display of forwarded notification messages at the image monitor in response to determining the multiple user presence.

16. The user engagement system of claim 11, wherein determining a user presence comprises determining a human-form outline.

17. The user engagement system of claim 11, wherein the image signal is a first image signal, wherein the forward notification message is a first notification message, and wherein the message-display operation further comprises
receiving a second notification message forwarded from the user device,
affirming prior registration of the user device subsequent to receiving the second notification message,
receiving a second image signal from the camera assembly subsequent to affirming prior registration,
redetermining a user presence based on the received second image signal, and
displaying the second notification message at the image monitor subsequent to redetermining the user presence.

18. The user engagement system of claim 11, wherein determining prior registration of the user device comprises comparing a Bluetooth address of the user device with a recorded list of approved addresses.

19. The user engagement system of claim 11, further comprising receiving the forwarded notification message from the user device prior to receiving the image signal, wherein the determining the user presence occurs within a predetermined time period following receiving the forwarded notification message.

20. The user engagement system of claim 11, wherein the image signal is a second image signal, and wherein the message-display operation further comprises
receiving a first image signal prior to receiving the second image signal, and
failing to determine a user presence based on the first image signal, wherein receiving the second image signal occurs in response to failing to determine the user presence based on the first image signal.

* * * * *